United States Patent
Kennedy et al.

(10) Patent No.: US 6,817,767 B2
(45) Date of Patent: Nov. 16, 2004

(54) HYBRID SPINDLE BEARING

(75) Inventors: Michael David Kennedy, Boulder Creek, CA (US); Mohamed Mizanur Rahman, San Jose, CA (US); Hans Leuthold, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 16 days.

(21) Appl. No.: 10/186,477

(22) Filed: Jun. 28, 2002

(65) Prior Publication Data

US 2003/0142889 A1 Jul. 31, 2003

Related U.S. Application Data

(60) Provisional application No. 60/353,927, filed on Jan. 31, 2002.

(51) Int. Cl.$^7$ ............................................. F16C 32/06
(52) U.S. Cl. ....................................... 384/110; 384/100
(58) Field of Search ............................... 384/110, 100, 384/107; 360/99.08, 98

(56) References Cited

U.S. PATENT DOCUMENTS

| | | | |
|---|---|---|---|
| 4,394,091 A | 7/1983 | Klomp | 384/101 |
| 4,497,307 A | 2/1985 | Paar et al. | 123/90.33 |
| 4,597,676 A | 7/1986 | Vohr et al. | 384/114 |
| 4,710,034 A * | 12/1987 | Tittizer et al. | 384/110 |
| 5,209,631 A | 5/1993 | Bernhardt | 415/90 |
| 5,871,285 A | 2/1999 | Wasson | 384/118 |
| 5,873,657 A | 2/1999 | Lee | 384/110 |
| 5,947,608 A * | 9/1999 | Kim | 384/110 |
| 6,020,664 A | 2/2000 | Liu et al. | 310/90 |
| 6,071,014 A | 6/2000 | Lee et al. | 384/107 |
| 6,144,523 A * | 11/2000 | Murthy et al. | 360/99.08 |
| 6,292,328 B1 | 9/2001 | Rahman et al. | 360/99.08 |

FOREIGN PATENT DOCUMENTS

WO  WO 98/28550  7/1998

* cited by examiner

*Primary Examiner*—Thomas R. Hannon
(74) *Attorney, Agent, or Firm*—Raghunath S. Minisandram; Jesus Del Castillo

(57) ABSTRACT

A bearing system in which an axially stiff narrow gap fluid dynamic gas bearing. As an example two fluid dynamic bearings are provided spaced apart along a shaft, one of the bearings comprising a fluid dynamic bearing, the other comprising an air bearing. The fluid dynamic bearing has a larger gap, while the air bearing has a relatively small gap. The overall working surface area of the air bearing may be twice as much or more than the working surface area of the fluid bearing.

20 Claims, 3 Drawing Sheets

HYBRID SPINDLE BEARING

CROSS REFERENCE TO A RELATED APPLICATION

This application claims priority to a [provisional] application Ser. No. 60/353,927, filed Jan. 31, 2002, entitled HYBRID SPINDLE BEARING invented by Michael David Kennedy, Mohamed Mizanur Rahman and Hans Leuthold and incorporated herein by reference. The application of Leuthold et al, entitled Hybrid Spindle Bearing, attorney docket STL 3125, filed simultaneously herewith, is incorporated by reference.

FIELD OF THE INVENTION

The present invention relates generally to the field of hydrodynamic bearings, and more specifically to a design comprising multiple spindle bearings, the bearings having different gap sizes and fluids of different viscosities at least in order to provide balance and reduced power consumption.

BACKGROUND OF THE INVENTION

Disc drives are capable of storing large amounts of digital data in a relatively small area. The disc drives store information on one or more spinning recording media. The recording media conventionally takes the form of a circular storage disk in a plurality of concentric circular recording tracks. A typical disk drive has one or more disks for storing information. This information is written to and read from the disks using read/write heads mounted on actuator arms that are moved from track to track across surface of the disk by an actuator mechanism.

Generally, the disks are mounted on a spindle that is turned by a spindle motor to pass the surfaces of the disks under the read/write heads. The spindle motor generally includes a shaft supported from a base plate and a hub to which the spindle is attached having a sleeve into which the shaft is inserted. Permanent magnets, which are typically attached to the hub, interact with a stator winding to rotate the hub relative to the shaft. This description is consistent with a fixed shaft motor; however, the invention to be described below is as easily useable with a motor comprising a rotating shaft, an end of the shaft supporting the hub for rotation to rotate the disks.

In either case, to facilitate rotation, one or more bearings are disposed between the hub or sleeve and the shaft.

Over time, disk drive storage density has tended to increase, and the size of the storage system has tended to decrease. This trend has led to greater emphasis on restrictive tolerances in the manufacturing and operation of magnetic storage disk drives. For example, to achieve increased storage density, read/write heads must be placed increasingly close to the surface of the storage disk.

As a result, the bearing assembly which supports the storage disk is of critical importance. A typical bearing assembly of the prior art comprises ball bearings supported between a pair of bearing races which allow a hub of a storage disk to rotate relative to a fixed member. However, ball bearing assemblies have many mechanical problems such as wear, run-out and manufacturing difficulties. Moreover, resistance to operating shock and vibration is poor because of damping.

An alternative bearing design is a fluid dynamic bearing. In a fluid dynamic bearing, lubricating fluid such as air/gas or liquid provides a bearing surface between a fixed member of the housing (e.g., the shaft) and a rotating member which supports the disk hub. Typical lubricants include oil or similar hydrodynamic liquids. Hydrodynamic bearings spread the bearing interface over a large surface area in comparison with a ball bearing assembly, which comprises a series of point interfaces. This is desirable because the increased bearing surface reduces wobble and run-out between the rotating and fixed members. Further, the use of liquid in the interface area imparts damping effects to the bearing which helps to reduce non-repeat run-out.

It is also known that the stiffness to power ratio is a primary way of measuring the efficiency of the spindle bearing assembly. Most known fluid dynamic bearings today in commercial use are made with oil or other liquid as the fluid which is maintained in the gap between the two relatively rotating surfaces. This maintains the stiffness of the bearing, that is the resistance to shock and vibration; however, because of the relatively high viscosity of such fluids, at lower temperatures, such as at startup, considerable power is consumed to establish and maintain high speed rotation.

SUMMARY OF THE INVENTION

It is an objective of the present invention to provide a bearing system in which the stiffness is maintained while the power consumption necessary to establish and maintain rotation of the bearing system is reduced.

It is a further objective of the invention to provide a bearing system in which a relatively stiff, low power system is achieved without utilizing fluid dynamic bearings with extremely small gaps in all embodiments.

These and other objectives of the invention are provided in a bearing system in which two axially stiff narrow gap fluid dynamic conical gas bearings are all provided. A fluid journal region (grooved or ungrooved) is provided between the conical bearings to provide added damping. More specifically, pursuant to the present invention a system is provided in which two fluid dynamic conical bearings are provided spaced apart along a shaft, with the spacing being sufficient to allow for definition of a liquid bearing between the conical bearings. In this exemplary embodiment, the fluid (liquid) dynamic bearing has a larger gap, while the air (or gas) bearing has a relatively small gap so that power consumption is diminished while stiffness is maintained.

According to embodiments of the present invention, the air bearing is substantially larger in size than the fluid bearing; to get stiffness to a desired level.

In a typical embodiment, each of the air bearings is a conical bearing comprising a cone supported on the shaft, with a surrounding sleeve providing a surface facing an outer surface of the cone, the gaps being defined between the surfaces of the cone and the sleeve. The journal bearing, supported by liquid, typically has a substantially smaller working surface area than the conical bearings, supported by air/gas.

Other features and advantages of the invention and alternative approaches will be apparent to a person of skill in the art who studies the following exemplary embodiments of the invention, given with reference to the following drawings.

DETAILED DESCRIPTION OF THE PREFERRED EMBODIMENTS

Figure 1:
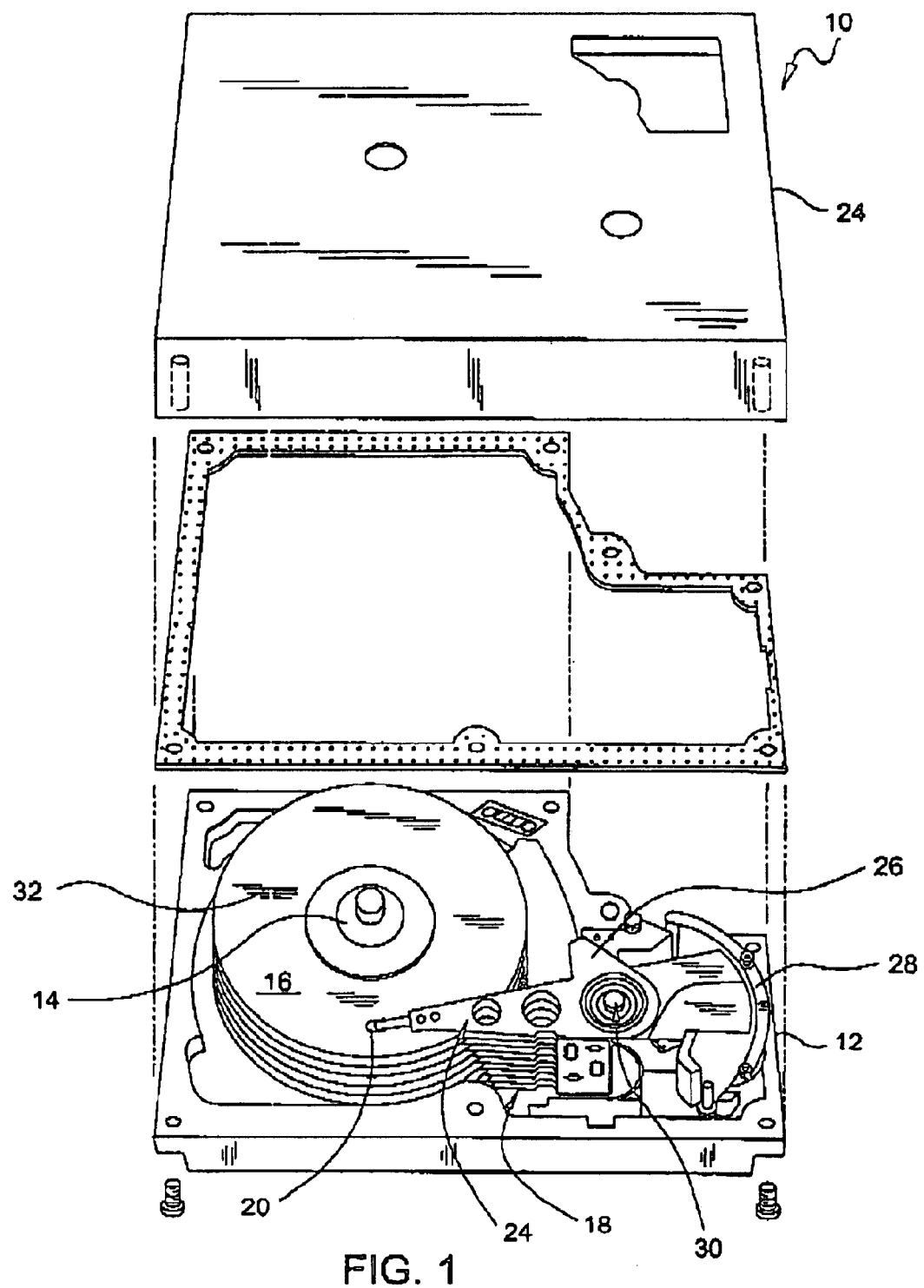
FIG. 1 is a perspective view of a disc drive in which the bearing system of the present invention is especially useful.

FIG. 1 depicts a plan view of an embodiment of a typical disc drive in which embodiments of the present invention, because of its stability and long life are especially useful. Referring to FIG. 1, the disc drive 10 includes a housing base 12 and a top cover 24. The housing base 12 is combined with cover 24 to form a sealed environment to protect the internal components from contamination by elements outside the sealed environment. The base and top cover arrangement shown in FIG. 1 is well known in the industry. However, other arrangements of the housing components have been frequently used and there is no particular limitation to the configuration of the housing.

The disc drive further includes a disc pack comprising one or more discs mounted for rotation on a spindle motor by disc clamp (not shown). The disc pack 16 of one or more discs provides, discs mounted for rotation about a central axis. Each disc surface has an associated read/write head 20 which is mounted to disc drive 10 for communicating with the disc surface. In the example shown in FIG. 1. read/write heads 20 are supported by a suspension arm assembly 18 which is in turn attached to head mounting arms 24 of an actuator body 26. The actuator shown in FIG. 1 is off the type known as a rotary moving coil actuator and includes a voice coil motor shown generally at 28. The voice coil motor rotates the actuator body 26 with its attached read/write heads 20 about a pivot shaft 30 to position read/write heads 20 over a desired data track along a path 32. While a rotary actuator is shown in FIG. 1, the invention may be used with other disc drives having other types of actuators such as linear actuators; in fact, the specific disc drive shown herein is intended only to be exemplary, not to be limiting in any sense.

Figure 2:
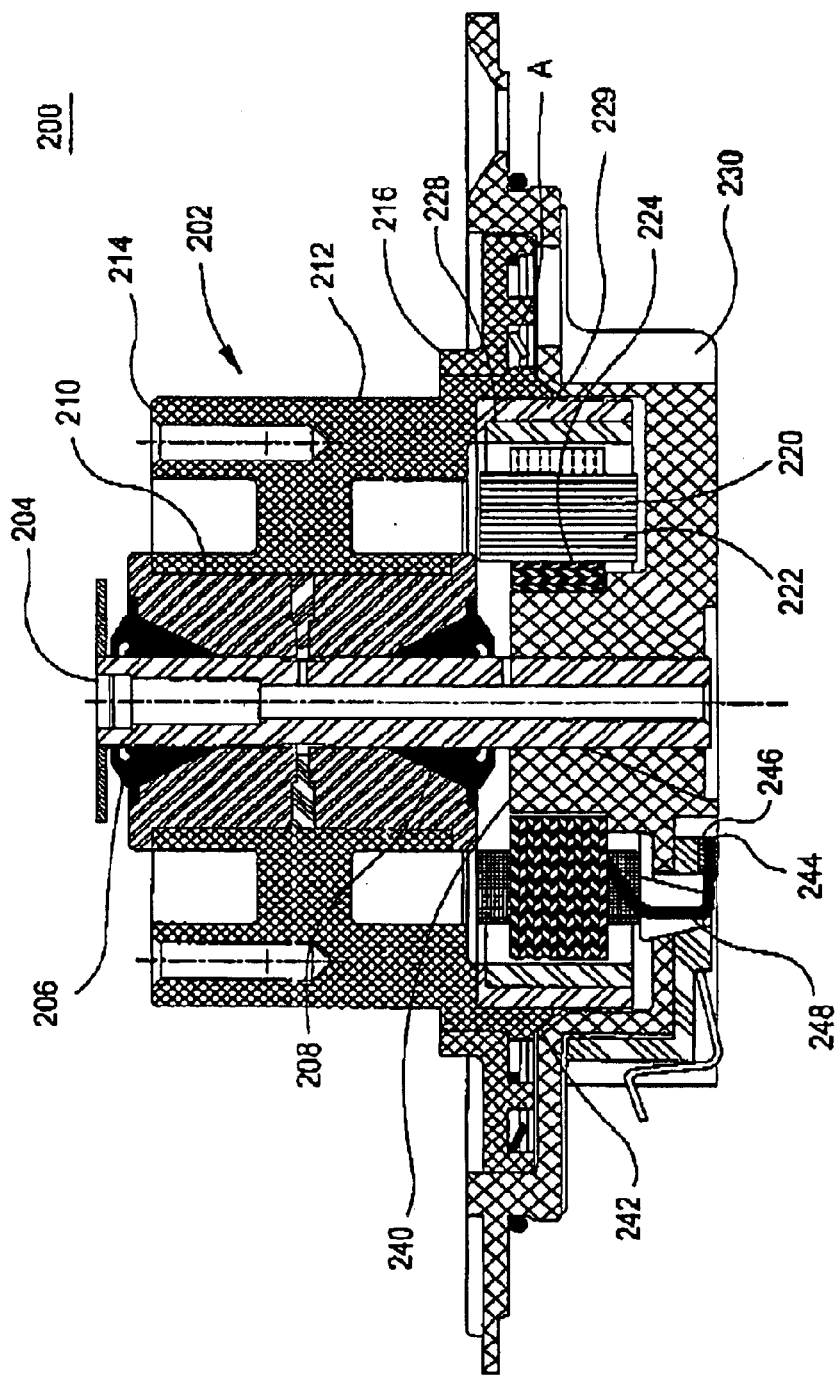
FIG. 2 is a vertical sectional view of a known bearing system as used in the prior art.

FIG. 2 is a vertical sectional view of a known spindle motor including a set of conical hydrodynamic bearings 206, 208 which support the shaft 204 and hub 202 for relative rotation. The motor is a brushless direct current motor 200 comprising a hub 202 rotatably mounted about the stationary shaft 204 by the upper and lower bearings 206 and 208 respectively. The hub 202 which supports one or more discs (such as are shown in FIG. 1) for rotation is formed in a generally inverted U shape as seen in cross section, and has an inner annular sleeve 210, an outer cylindrical surface 212 and a top portion 214. Outer cylindrical surface 212 includes a shoulder 216 far supporting one or more discs in the contaminant free environment which encloses the motor and discs. A plurality of storage discs separated by spacers or washers could easily be stacked along the vertical length of outer cylindrical surface 212. The inner portion of hub 202 operably receives a stator, generally designated 220, including a stator lamination stack 224 and stator windings 222. A permanent magnet 228 is mourned on a back iron 229 supported from outer annular surface 212 for magnetically interacting with stator laminations stack 224 and stator windings 222. It is to be understood that a plurality of permanent magnets may make up the magnet 226 in this design.

Stator support 240 surround stationary shaft 204 and supports stator 220 in a substantially vertical position. Stator support 240 comprises a boss 242 formed in base plate number 230 which serves to maintain disc drive motor 200 in a spaced relation with respect to base member 230. The stator 220 is bonded to the base 230.

A circuit connector 244 is mounted to a lower surface 246 of the base member 230. The circuit connector 244 is electronically connected to stator windings 222 by a wire 248 for electrical communication between the stator windings 222 and a printed circuit board (not shown). By energization of this circuitry, we create torque to run at right speed, and control signals cause constant speed rotation of the hub about the shaft 204 as supported by the upper and lower conical bearings 206, 208.

Considering the known fluid dynamic bearings such as shown in FIG. 2, the efficiency of the spindle bearing assembly may be expressed in the form of a stiffness to power ratio with stiffness being the ability to withstand shock, and power being power consumed to establish and maintain relative rotation between the two sides of the bearing as supported by the fluid in the gap between those two sides. Typically, in designing a motor using hydrodynamic bearings, the specification is established for stiffness and for power; the objective then becomes to achieve both of the specifications, and to optimize this ratio of stiffness to power.

It is known that the viscosity of air is about 1/256 of a typical oil at 70° C. which is considered to be a typical operating temperature for a fluid bearing; it is further known that the viscosity of air is independent of temperature. This eliminates the dilemma of having to make tradeoffs of low temperature power (which is where most power is consumed in a fluid bearing) versus high temperature stiffness (which is where, due to the decrease in viscosity, stiffness is typically lost in a bearing utilizing fluid in the gap), making an air (or gas) bearing gap desirable.

Self-pressurized air bearing spindles have been designed which provide sufficient stiffness for operation. However, due to the lack of damping which an air bearing spindle has, instabilities are encountered, especially at specific frequencies within the required operating bandwidth area. Oil bearings do not encounter this problem, due to their inherent damping because of the viscosity of the fluid in the gap. Thus, the invention herein takes advantage of the fact the viscosity of air is temperature independent, thus reducing the power consumption of such a bearing. A spindle support system is thus provided such that stiffness is provided via the air bearing surfaces, while damping is provided by the oil bearing surface along the journal; in this way the instabilities encountered with air bearing spindles can be significantly reduced.

Figure 3:
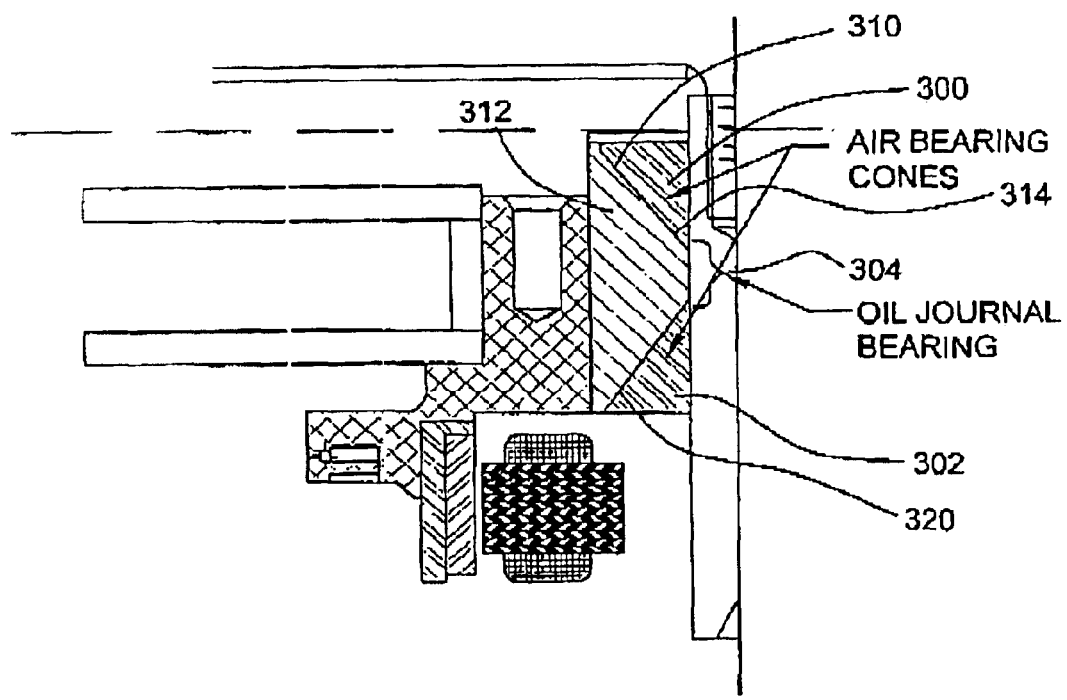
FIG. 3 is a vertical sectional view of a bearing system according to the present invention.

Thus, referring to FIG. 3, an exemplary embodiment is shown. While the exemplary embodiment is essentially shown as a modification to the design of FIG. 2, it is readily apparent that the principles and structures of this embodiment can be applied to all forms of fluid bearing cartridges and spindle motors incorporating fluid and hydrodynamic bearings. FIG. 3 shows a spindle support system comprising two bearings 300, 302 which are generally conical in shape, separated by a fluid bearing 304. The bearings 300, 302 have air bearing surfaces; the gap 310 which separates the hub 312 from the bearing 300 is filled with air or gas; to provide the desired stiffness, this gap 310 is very thin. However, since only air or gas is used in the gap 310, the gap 310 can be very narrow. And since the stiffness-to-power ratio is proportional to one divided by the gap squared, this very small gap 310 will lead to the greatest efficiency for the overall spindle support system. The air bearing 302 is of similar in design to bearing 300, and is separated from the hub 312 by a gap 320 that is similar to the gap 310, and is filled with air or gas.

Returning next to the oil or fluid journal bearing 304, this bearing is present to provide damping; it may be sized to provide stiffness as well. Since the gap between the sleeve and the shaft is continuous, the journal bearing fluid is sealed in place by a capillary seal at either end or any other sealing mechanism effective at preventing travel of the fluid into the air bearing gaps. The length of this journal bearing 304, and therefore its effective operating surface area, should be significantly less than the operating surface area or effective surface area of the air bearings 300, 302. Another notable dimension is that the length of the journal bearing 304 should be substantially less than the length or radius of each of the air bearings 302, 300. Finally, the gap dimension of the bearing 304 should be substantially greater, as much as 4 times greater than the gap dimension of the air bearings 300, 302.

In summary, the target efficiency improvement can be achieved by moving in the direction of making the working surfaces of the air or gas bearing, as large as possible. Further, the gap of the air/gas bearing should be small, to achieve stiffness. Incorporating a small fluid journal and a large air bearing minimize power consumed.

The objective has been to maintain the dynamic performance while minimizing power consumption by providing that one of the bearings has a large gap with a high viscosity fluid, the bearing having a small working surface dimensions, and the other bearing having a small gap and a low viscosity gas or air in the gap and relatively large working surface dimensions.

Both of these bearings can be dimensioned so that the dynamic performance on the spindle from both bearings is as similar as possible to each other, so that no imbalance movement results. Further the total axial play in such a bearing combination will be somewhat diminished relative to the axial play obtained in a corresponding pair of fluid bearings. Thus, although the axial play is not idealized, it is an improvement over standard two bearing designs in terms of power consumption and stiffness and does achieve some reduction in axial play.

The disclosed embodiments are achievable with current manufacturing technologies at reasonable cost. By the same token, the stiffness, while not improved because of the presence of one air bearing, is either maintained or close to being maintained while the total power consumed is minimized. For example, today's high-speed spindles take about half of the whole mechanical power in the system; a hybrid such as disclosed above can save about 30% of that power consumption.

Other features and advantages of the invention would be apparent to a person of skill in the art who studies this disclosure. Therefore, the scope of the invention is to be limited only by the following claims.

What is claimed is:

1. A fluid dynamic bearing system, comprising:
   an inner member;
   an outer member;
   a first conical element coupled to the inner member and having a first outer surface;
   a second conical element coupled to the inner member and having a second outer surface, the first conical element and the second conical element spaced apart from one another along the inner member;
   a first fluid dynamic bearing having a first gap, the first fluid dynamic bearing disposed along the first outer surface and configured to support the relative rotation of the outer member and the inner member,
   a second fluid dynamic bearing having a second gap, the second fluid dynamic bearing disposed along the second outer surface and configured to support the relative rotation of the outer member and the inner member; and
   a damping element disposed along a surface of the inner member between the first conical element and the second conical element.

2. The fluid dynamic bearing system of claim 1, wherein the first gap and the second gap contain a first fluid, the first fluid comprising a gas.

3. The fluid dynamic bearing system of claim 2, wherein the gas is air.

4. The fluid dynamic bearing system of claim 2, wherein the damping element comprises a fluid dynamic journal bearing having a third gap containing a second fluid to provide damping, the second fluid comprising a liquid.

5. The fluid dynamic bearing system of claim 4, wherein the liquid is oil.

6. The fluid dynamic bearing system of claim 4, wherein the first gap and the second gap are substantially smaller than the third gap.

7. The fluid dynamic bearing system of claim 6, wherein the first gap and the second gap are approximately one-fourth the size of the thin gap.

8. The fluid dynamic bearing system of claim 4, wherein the first fluid dynamic bearing has a first radius, the second fluid dynamic bearing has a second radius and the fluid dynamic journal bearing has a first length, the first radius and the second radius substantially larger than the first length.

9. The fluid dynamic bearing system of claim 4, further comprising a first capillary seal defined between the first conical element and the fluid dynamic journal bearing and a second capillary seal defined between the second conical element and the fluid dynamic journal bearing.

10. The fluid dynamic bearing system of claim 1, wherein the fluid dynamic bearing system is coupled to a base of a disc drive, the second fluid dynamic bearing disposed proximally to the base.

11. The fluid dynamic bearing system of claim 10, wherein the first gap and the second gap contain a first fluid, the first fluid comprising a gas.

12. The fluid dynamic bearing system of claim 11, wherein the gas is air.

13. The fluid dynamic bearing system of claim 11, wherein the damping element comprises a fluid dynamic journal bearing having a third gap containing a second fluid to provide damping, the second fluid comprising a liquid.

14. The fluid dynamic bearing system of claim 13, wherein the liquid is oil.

15. The fluid dynamic beating system of claim 13, wherein the first gap and the second gap are substantially smaller than the third gap.

16. The fluid dynamic bearing system of claim 15, wherein the first gap and the second gap are approximately one-forth the size of the third gap.

17. The fluid dynamic bearing system of claim 13, wherein the first fluid dynamic bearing has a first radius, the second fluid dynamic bearing has a second radius and the fluid dynamic journal bearing has a first length, the first radius and the second radius substantially larger than the first length.

18. The fluid dynamic bearing system of claim 13, further comprising a first capillary seal defined between the first conical element and the fluid dynamic journal bearing and a second capillary seal defined between the second conical element and the fluid dynamic journal bearing.

19. The fluid dynamic bearing system of claim 13, wherein the inner member comprises a shaft and the outer member comprises a sleeve, the sleeve coupled to a hub, the hub configured to support one or more discs.

20. The fluid dynamic bearing system of claim 19, wherein the disc drive includes a spindle motor, the spindle motor comprising the shaft coupled to the base and configured to support the one or more discs for constant rotation about the shaft.

* * * * *